United States Patent [19]

Buma

[11] Patent Number: 4,651,977
[45] Date of Patent: Mar. 24, 1987

[54] COUPLING CONSTRUCTION OF SHOCK ABSORBER

[75] Inventor: Shuuichi Buma, Toyota, Japan

[73] Assignee: Toyota Jidosha Kabushiki Kaisha, Toyota, Japan

[21] Appl. No.: 753,785

[22] Filed: Jul. 11, 1985

[30] Foreign Application Priority Data

Oct. 18, 1984 [JP] Japan .................................. 59-217394

[51] Int. Cl.$^4$ ..................... B60G 11/54; B60G 11/58; B60G 11/62; F16F 9/46
[52] U.S. Cl. .................................. 267/8 R; 188/299; 188/321.11; 267/33; 267/34; 267/35; 267/64.25; 280/714
[58] Field of Search ............ 267/8 R, 8 B, 8 C, 8 D, 267/8 A, 9 R, 9 B, 9 A, 9 C, 10, 33, 34, 35, 64.25, 64.28, 152, 140.1; 188/283, 299, 319, 321.11; 280/668, 710, 708, 712, 713, 714

[56] References Cited

U.S. PATENT DOCUMENTS 4,159,105 6/1979 Vander Laan et al. ........ 280/710 X
4,534,580 8/1985 Kobayashi et al. ................ 280/712
4,592,540 6/1986 Yokoya et al. ..................... 267/8 R

FOREIGN PATENT DOCUMENTS 2401787 3/1979 France .............................. 188/321.11
57-186650 11/1982 Japan ............................... 188/321.11
58-76837 5/1983 Japan .

Primary Examiner—Douglas C. Butler
Assistant Examiner—Richard R. Diefendorf
Attorney, Agent, or Firm—Oblon, Fisher, Spivak, McClelland & Maier

[57] ABSTRACT

A construction for coupling a car body with a shock absorber having a piston rod comprises a valve base coupled with the piston rod and having a hole extending from an upper end surface to an intermediate portion axially of the piston rod for inserting a valve body, a first path consisting of a plurality of path portions extending from the hole to an outer peripheral surface and having different bores and a second path spaced axially from the first path and extending from the hole to the outer peripheral surface, a bushing having a first fluid chamber communicating to the first path and second fluid chamber communicating to the second path and disposed radially outward of the valve base, a connecting member for coupling the bushing with the car body, the valve body having a third path capable of affording and interrupting communication for the first and second paths and disposed rotatably in the hole of the valve and an actuator for operating the valve body.

9 Claims, 4 Drawing Figures

COUPLING CONSTRUCTION OF SHOCK ABSORBER

BACKGROUND OF THE INVENTION

1. Field of the Invention

This invention relates to a coupling construction of a shock absorber, and more particularly, to a construction for coupling a piston rod of the shock absorber with a car body.

2. Description of the Prior Art

Generally, when a piston rod of a shock absorber is coupled with a car body, a construction is employed in which a rubber bushing is interposed between the piston rod and the car body to prevent the car body from undergoing vibration transmitted from the shock absorber. However, the spring constant of the bushing is determined unconditionally and cannot be changed after the bushing, having predetermined hardness, profile and the like of rubber is incorporated in the car body.

An insulation construction was disclosed in the publication of the laying-open for public inspection of a Utility Model Application No. 76837/83, in which a first fluid chamber is defined by a bushing and a plate member, and a second fluid chamber is defined by the plate member and a diaphragm disposed on the opposite side of bushing to the plate member. Both fluid chambers are filled with fluid and communicate to each other through an orifice. According to this insulation construction, the vibrations transmitted from a shock absorber in the high and low frequency regions are reduced respectively by the bushing and a damping force produced when the fluid passes through the orifice.

In the construction disclosed in said publication the spring constant or damping coefficient of the bushing cannot be manually or automatically changed according to the running condition or taste.

SUMMARY OF THE INVENTION

An object of the present invention is to provide a coupling construction of a shock absorber in which the spring constant and damping coefficient of a bushing can be changed externally.

According to the present invention, there is provided a construction in which the shock absorber having a piston rod is coupled with a car body. The construction comprises a valve base having a hole into which a valve body is inserted and coupled with said piston rod, a bushing having a plurality of fluid chambers and disposed radially outward of said valve base, a connecting member for coupling the bushing with said car body, the valve body being disposed in said hole of said valve base to afford and interrupt communication between a plurality of said fluid chambers, and an actuator for operating said valve body.

In a plurality of the fluid chambers are enclosed oil and other liquids, also air and other gases or a mixture of liquid and gases. When these fluid chambers communicate with each other through the valve body, the fluid flows through these fluid chambers so that the damping force is produced by the flow of the fluid in addition to the original spring constant of the bushing. When communication between these fluid chambers is interrupted, the production of the damping force due to the flow of the fluid disappears.

According to the present invention the spring constant and damping coefficient of the bushing can be manually or automatically changed so that they can be changed according to the running condition or taste to provide improved drivability, controllability and travelling stability or the like.

Generally, since the valve base is formed of a high rigidity material, the valve base is not deformed even if the bushing is axially deformed. Thus, the valve body in the valve base always occupies a normal position to securely control the communication or interruption through a throttle or the like between two liquid chambers.

Other objects and features of the present invention will become apparent from the following description of a preferred embodiment of the invention with reference to the accompanying drawings.

DESCRIPTION OF THE PREFERRED EMBODIMENT

Figure 1:
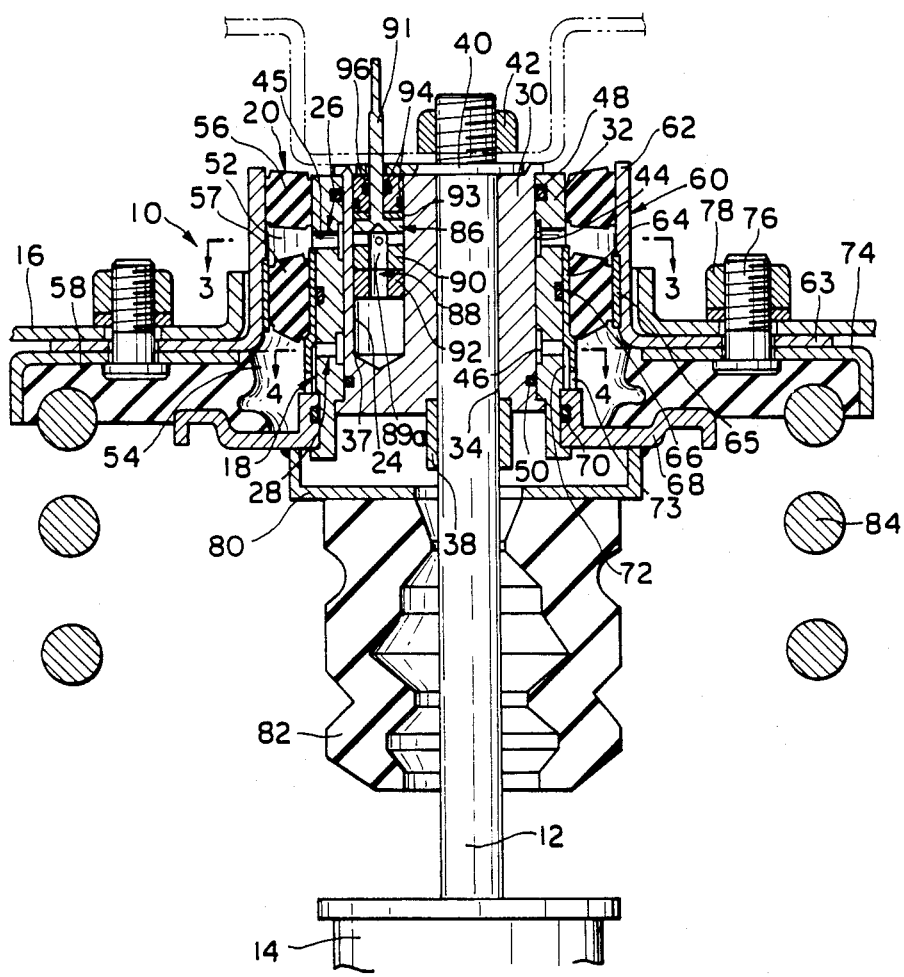
FIG. 1 is a sectional view showing a coupling construction according to the present invention.
Figure 2:
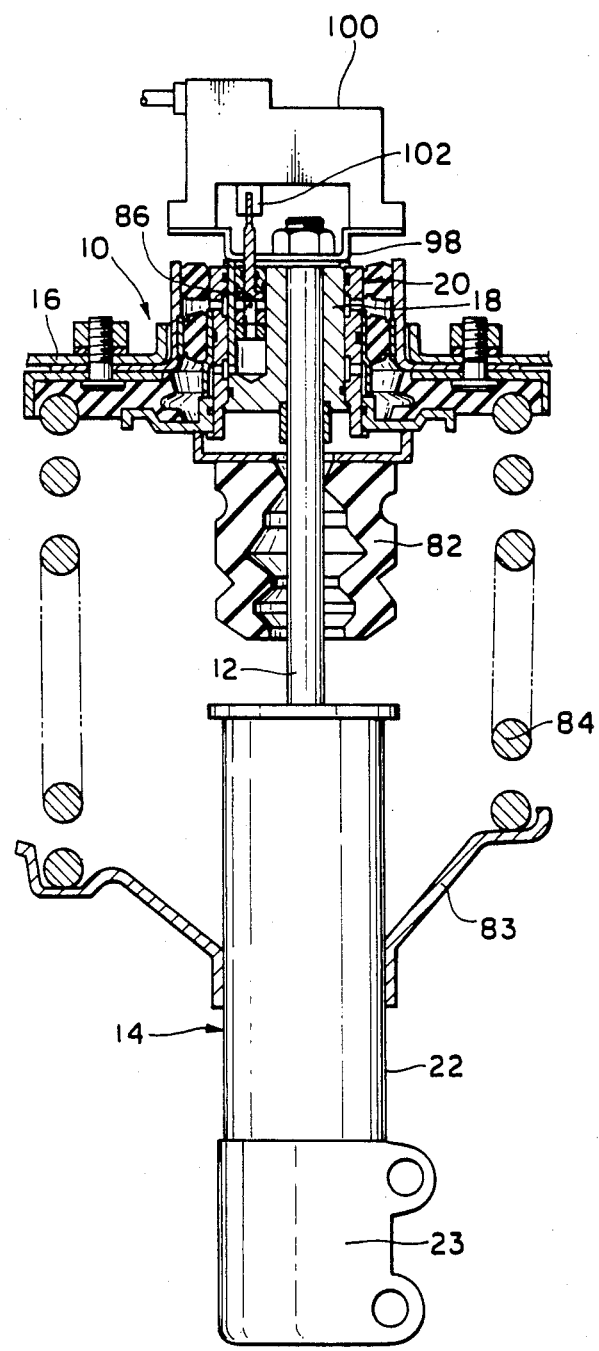
FIG. 2 is a front view showing a shock absorber connected to a car body by the coupling construction.

As shown in FIGS. 1 and 2, a coupling construction 10 comprises a coupling a piston rod 12 of a shock absorber 14 with a car body 16 and comprising a valve base 18 and a bushing 20.

The shock absorber 14 is a well-known one per se in which a piston (not shown) is movably disposed in a tube 22 and the piston rod 12 connected to the piston projects through an opening in the tube 22 to the outside. For the shock absorber 14 are used a so-called twin tube type one provided with two tubes spaced from each other and a so-called monotube one having only one tube. To the lower portion of the shock absorber 14 is connected a suspension arm (not shown) through a bracket 23.

The valve base 18 has a hole 24 for inserting a valve body, first and second paths 26, 28 spaced from each other and respectively communicating to the hole 24. The valve base 18 is coupled with the piston rod 12. In an embodiment shown in the drawing, the valve base 18 consists of a first member 30 disposed in the inside and formed of high rigidity material like iron and a second member 32 disposed on the outside and formed of similar high rigidity material for the convenience in forming the valve base 18 and the bushing 20. The valve base 18 may be formed of a single member. Since the valve base 18 formed of the high rigidity member has the valve body disposed therein as will be later described, the valve base 18 will not be deformed even if the bushing 20 is deformed in use, so that the valve body is securely held in a predetermined position.

Figure 3:
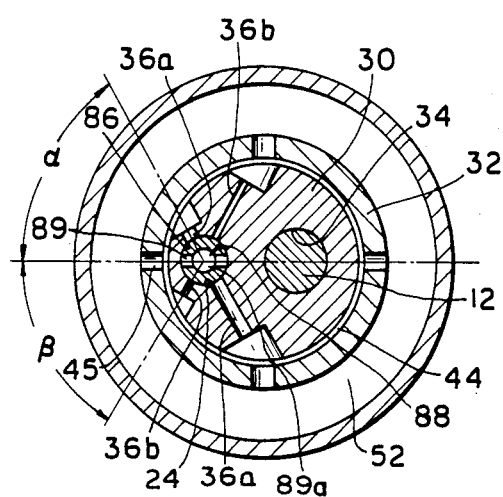
FIG. 3 is a sectional view taken along the line 3—3 in FIG. 1.

As shown in FIGS. 1 and 3, the first member 30 has a hole 34 through which the piston rod 12 extends, the hole 24 extending parallel to the hole 34 from an upper surface to an intermediate portion for inserting the valve body, a pair of path portions 36a extending respectively from the upper position of the hole 24 toward and outer peripheral surface, and a pair of path portions or passages 36b having a bore smaller than that of each path portion 36a. Angles $\alpha, \beta$ made by the path portions 36a, 36b and the axis of a hole 89 in the valve body are equal to each other and 60° in the embodiment shown in the drawing.

Figure 4:
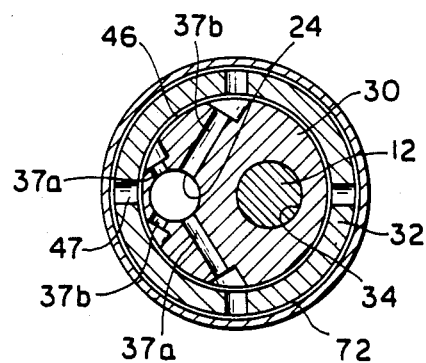
FIG. 4 is a sectional view taken along the line 4—4 in FIG. 1.

As shown in FIG. 4, the first member 30 has further a pair of path portions 37a and a pair of path portions 37b respectively extending from the lower position of the hole 24 toward the outer peripheral surface. In the embodiment shown in the drawing, while the path portions 37a, 37b differ from each other in the bore, they may have the same bore. The bores of these path portions 37a,37b are determined according to the fluid passing through these path portions 37a, 37b not to produce the damping force. Thus, instead of the path portions 37a, 37b, a single large bore path portion may be employed. The respective path portions have enlarged diameters at the vicinity of the outer peripheral surface. The piston rod 12 extends through the hole 34 and a ring 38 fixed to the piston rod bears against a shoulder of the hole 34. A portion of the piston rod projecting from the first member 30 is fitted in a washer 40 and a nut 42 is screwed onto it. As a result, the piston rod 12 is coupled with the first member 30.

The second member 32 has an annular groove 44 provided in a position opposed to the path portions 36a, 36b of the first member 30, a plurality of path portions 45 (four in FIG. 3) extending radially from the annular groove 44, further an annular groove 46 provided in a position opposed to the path portions 37a, 37b of the first member 30 and a plurality of path portions 47 (four in FIG. 4) extending radially from the annular groove 46.

The first path 26 is formed of the pair of path portions 36a and pair of path portions 36b of the first member 30, the annular groove 44 and the path portions 45 of the second member 32. Also, the second path 28 is formed of the pair of path portions 37a and pair of path portions 37b of the first member 30, the annular groove 46 and the path portions 47 of the second member 32.

With a sealing O-ring 48 being fixed to a position above the annular groove 44 of the second member 32 and an O-ring 50 being fixed to a position of the first member 30 below the portion opposed to the annular groove 46 of the second member 32, the first member 30 is fitted in the second member 32 and both members are coupled with each other by caulking the first member 30 to provide the valve base 18.

The bushing 20 has a first fluid chamber 52 communicating to the first path 26 and a second fluid chamber 54 communicating to the second path 28 and spaced axially of the piston rod 12 from said first fluid chamber 52. The bushing 20 is disposed radially outward on the valve base 18. In the embodiment shown in the drawing, the bushing 20 consists of first, second and third portions 56, 57 and 58 formed annularly and each being formed of rubber. Since a load is applied to the bushing 20 axially of the piston rod 12, when the first and second fluid chambers 52, 54 are arranged axially as shown in FIG. 1, fluid flow flowing between both fluid chambers will be increased most effectively by the deformation of the bushing 20.

The first portion 56 of the bushing is bonded on the inside surface to an end of the second member 32 above the first path 26 of the valve base 18 and on the outside surface to an upper end of a cylindrical portion 62 of a connecting member 60 respectively. The second portion 57 of the bushing is bonded on the inside surface to an inner tube 64 and on the outside surface to an outer tube 65 respectively. The inner tube 64 of the second portion 57 is fitted at a position below the first path 26 of the second member 32 to which an O-ring 66 is fixed, and the outer tube 65 is fitted in the cylindrical portion 62 of the connecting member 60. As a result, the first fluid chamber 52 is defined between the first portion 56 and a second portion 57 of the bushing.

In the embodiment shown in the drawing, the inner tube 64 extends downward over the second path 28 and the lower end thereof bears against a shock receiving member 68. The shock receiving member 68 having an O-ring 70 is fitted on the second member 32 to be coupled therewith by caulking said second member 32. A lower portion of the inner tube 64 below the portion opposed to the second path 28 has an enlarged diameter so as to form a gap 72 between inner tube 64 and the second member 32. This gap 72 communicates to the second path 28 on one hand and to the second fluid chamber 54 through a plurality of notches 73 provided in the inner tube 64 on the other hand. While the inner tube 64 is thus formed for the convenience of positioning the inner tube 64, the length of the inner tube 64 may be determined so as not to extend the second path 28.

The third portion 58 of the bushing is bonded to a connecting member 74 on the upper end and on the inner peripheral portion of the lower end surface to the shock receiving member 68 respectively. A plurality of serrated bolts 76 (two in FIG. 1) are forced into the connecting member 74 to extend through a flange portion 63 of the connecting member 60 and the car body 16. A nut 78 is screwed onto the bolt 76 to fix the third portion 58 to the car body 16. As a result, the second fluid chamber 54 is defined between the second and third portions 57, 58.

A stopper carrier 80 is welded to the shock receiving member 68 and a bound stopper is bonded to the carrier 80.

In the embodiment shown in the drawing, the third portion 58 of the bushing is a spring carrier for a coil spring 84 and also an insulator for interrupting vibrations applied thereto from the coil spring. The coil spring 84 is disposed to surround the shock absorber 14 and engages on the lower end a spring carrier 83 welded to the tube 22 of the shock absorber 14 and on the upper end the third portion 58.

A valve body 86 has a third path capable of affording communication between the first and second paths 26, 28 in the valve base 18. In the embodiment shown in FIG. 1, the valve body 86 consists of a slide portion 90 disposed in the hole 24 in the valve base 18 and a reduced diameter portion 91 extending upward integrally with the slide portion. The slide portion 90 is provided with a third path 88 consisting of a hole portion 89a extending axially from a lower end surface to an intermediate portion and a hole portion 89 opened diametrically to an outer peripheral surface. An end of the reduced diameter portion 91 is formed flat.

When a diametrically hole portion 89 in the valve body 86 is in the position shown in FIG. 3, the hole portion 89 does not communicate to the first path 26 and the communication between the first and second paths 26, 28 is interrupted. When the valve body 86 is rotated 60° clockwise, the hole portion 89 communicates to the pair of path portions 36a. Further, when the valve body 86 is rotated 60° clockwise, the hole portion 89 communicates with the pair of path portions 36b.

A cylindrical holder 92 is forced into the hole 24 in the first member 30 of the valve base to be spaced from the bottom of the hole, and a space below the holder 92 is formed as a reservoir chamber for fluid. The valve body 86 is rotatably disposed on the upper side of the holder 92 and further a thrust bushing 93 with low coefficient of friction is disposed on the upper side of the valve body 86. A holder 96 to which an O-ring 94 is fixed is inserted on the upper side of the thrust bushing 93 and the holder 96 is held by the washer 40 a portion of which extends above the holder 96. According to this constitution, since the holder 96 is held by the nut 42 and washer 40 for coupling the piston rod 12 with the valve base 18, the holder 96 does not need to be forced into the hole 24. Thus, when the O-ring 94 and the valve body 86 wear for example, the holder 96 can be removed for interchanging of these parts.

As shown in the embodiment, the valve base 18 is provided with two paths 26, 28 and the valve body 86 is disposed in the valve base 18 so that the whole coupling construction can be made compact.

As shown in FIG. 2, an actuator 100 is coupled with the piston rod 12 through a bracket 98. The actuator 100 per se includes a well-known motor and reduction gear, and the upper flat portion of the valve body 86 is inserted in a slit provided on an output shaft 102 so that the valve body 86 is rotated by the actuator 100.

Fluid, i.e. oil and other luquid, air and other gas or mixture of liquid and gas are enclosed in the first and second fluid chambers 52, 54.

Obviously, numerous modifications and variations of the present invention are possible in light of the above teachings. It is therefore to be understood that within the scope of the appended claims, the invention may be practiced otherwise than as specifically described herein.

When an automobile travels, the actuator 100 is operated by the manual operation of a driver or the operation of a controller which calculates upon receiving signal from a speed sensor, acceleration sensor, a rotational angular velocity sensor of a steering wheel and other sensors to rotate the valve body 86.

When the valve body 86 is in the position shown in FIG. 3, communication between the first and second paths 26, 28 is interrupted so that fluid does not flow and the housing 20 has the hard spring constant not to produce the damping force.

When the valve body 86 is rotated 60° clockwise, the hole portion 89 of the valve body 86 communicates to the pair of path portions 36a and the first and second fluid chambers 52, 54 communicate to each other through the path portions 36a. At this time, the soft spring constant is provided and the bore of the path portion 36a is large so that small damping force is produced by the flow of the fluid.

When the valve body 86 is rotated further 60° clockwise, the hole portion 89 communicates to the pair of path portions 36b and the first fluid chamber 52 communicates to the second one 54 through the path portions 36b. Then, the spring constant has a medium hardness and the bore of the path portion 36b is small so that a large damping force is produced by the flow of the fluid.

What is claimed is:

1. A coupling construction for coupling a car body with a shock absorber having a piston rod, comprising:
   a valve base having a hole formed therein and coupled with said piston rod;
   a bushing having a plurality of fluid chambers and which is disposed radially outward of said valve base;
   a connecting member for coupling the bushing with said car body;
   a valve body disposed in said hole of said valve base for affording and interrupting communication between said plurality of said fluid chambers;
   an actuator for operating said valve body, and
   said actuator forming means for externally changing a spring constant and damping coefficient of the bushing through said valve body.

2. A coupling construction of a shock absorber as claimed in claim 1, wherein said plurality of fluid chambers are provided spaced from each other axially of said piston rod.

3. A coupling construction of a shock absorber as claimed in claim 1, further comprising a coil spring disposed so as to surround said shock absorber wherein said bushing engages an upper end of said coil spring.

4. A coupling construction for coupling a car body with a shock absorber having a piston rod, comprising:
   a valve base having a hole formed therein and coupled with said piston rod;
   a bushing disposed radially outward of said valve base and which comprises first, second and third annular portions spaced from each other axially of said piston rod, the bushing having a first fluid chamber defined between said first and second annular portions and a second fluid chamber defined between said second and third annular portions;
   a connecting member for coupling the bushing with said car body;
   said valve body being disposed in said hole of said valve base for affording and interrupting communication between said first and second fluid chambers;
   an actuator for operating said valve body; and
   said actuator forming means for externally changing a spring constant and damping coefficient of the bushing through the valve body.

5. A coupling construction for coupling a car body with a shock absorber having a piston rod, comprising:
   a valve base coupled with said piston rod and having a hole formed therein extending from an upper end surface to an intermediate portion axially of the piston rod, first passage means extending from said hole to an outer peripheral surface and second passage means extending from said hole spaced axially from the first passage means to the outer peripheral surface;
   a bushing disposed radially outward of said valve base and having a first fluid chamber communicating with said first passage means and a second fluid chamber communicating with said second passage means;
   a connecting member for coupling the bushing with said car body;
   a valve body disposed in said hole of said valve base and having third passage means for affording and interrupting communication with said first and second passage means;
   an actuator for operating said valve body; and
   said actuator forming means for externally changing a spring constant and damping coefficient of the bushing externally through the valve body.

6. A coupling construction of a shock absorber as claimed in claim 5, wherein one of said first and second passage means includes a plurality of passage portions having different diameter bores.

7. A coupling construction of a shock absorber as claimed in claim 6, further comprising means for rotating said valve body about an axis of the hole.

8. A coupling construction of a shock absorber as claimed in claim 5, wherein said bushing comprises first, second and third annular portions spaced from each other axially of said piston rod, and wherein said first fluid chamber is defined between said first and second annular portions and said second fluid chamber is defined between said second and third annular portions.

9. A coupling construction of a shock absorber as claimed in claim 8, wherein said third annular portion of the bushing is positioned at a lowest axial position and has a diameter larger than that of the first and second annular portions and further comprising a coil spring disposed so as to surround said shock absorber wherein said third portion engages an upper end of said coil spring.

* * * * *